(12) United States Patent  
Guinart et al.

(10) Patent No.: US 10,449,810 B2  
(45) Date of Patent: Oct. 22, 2019

(54) METHOD FOR LOCATING THE POSITION OF THE WHEELS OF A VEHICLE

(75) Inventors: Nicolas Guinart, Toulouse (FR); Jérôme Montigny, Roquettes (FR); Jacques Delaire, Toulouse (FR); Olivier Fudulea, Toulouse (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 1109 days.

(21) Appl. No.: 14/005,458

(22) PCT Filed: Mar. 30, 2012

(86) PCT No.: PCT/EP2012/001405  
§ 371 (c)(1),  
(2), (4) Date: Oct. 1, 2013

(87) PCT Pub. No.: WO2012/139711  
PCT Pub. Date: Oct. 18, 2012

(65) Prior Publication Data  
US 2014/0019003 A1 Jan. 16, 2014

(30) Foreign Application Priority Data  
Apr. 14, 2011 (FR) ...................................... 11 01152

(51) Int. Cl.  
*B60C 23/00* (2006.01)  
*B60C 23/04* (2006.01)

(52) U.S. Cl.  
CPC .......... *B60C 23/00* (2013.01); *B60C 23/0416* (2013.01); *B60C 23/0488* (2013.01); *B60C 23/0489* (2013.01)

(58) Field of Classification Search  
USPC ........................................................ 701/34.4  
See application file for complete search history.

(56) References Cited

U.S. PATENT DOCUMENTS 5,363,300 A * 11/1994 Lin .......................... B60T 8/171  
                                                                180/197  
5,808,190 A    9/1998 Ernst  
(Continued)

FOREIGN PATENT DOCUMENTS

CN        1613674      5/2005  
EP       0 806 306 A2   11/1997  
(Continued)

OTHER PUBLICATIONS

International Search Report, dated May 14, 2012, from corresponding PCT application.

*Primary Examiner* — Jean Paul Cass  
(74) *Attorney, Agent, or Firm* — Young & Thompson

(57) ABSTRACT

Method for locating the position of the wheels of a vehicle, each equipped with an electronic module for measuring operational parameters of each wheel, includes: controlling the transmission, by the module equipping that wheel, of n signals transmitted at times $t_1$ to $t_n$ for given angular positions $\theta_1$ to $\theta_n$ of the module, to a connected central processing unit, and to speed sensors each positioned close to a wheel, capable of delivering, values convertible into angular values, data representing the orientation of the wheel. The central processing unit is programmed to calculate, for each series of angular values $\delta_1$ to $\delta_n$ provided by a wheel measuring sensor at the times $t_1$ to $t_n$, a characteristic value $V_n 1 - V_n r$ representing the dispersion of the values $\delta_1$, $(\delta_2 - \theta_2) \ldots (\delta_n - \theta_n)$, and to compare the characteristic values to allocate, to the electronic module, the position of the wheel located close to the wheel speed sensor.

14 Claims, 3 Drawing Sheets

(56) References Cited

U.S. PATENT DOCUMENTS

Figure 1:
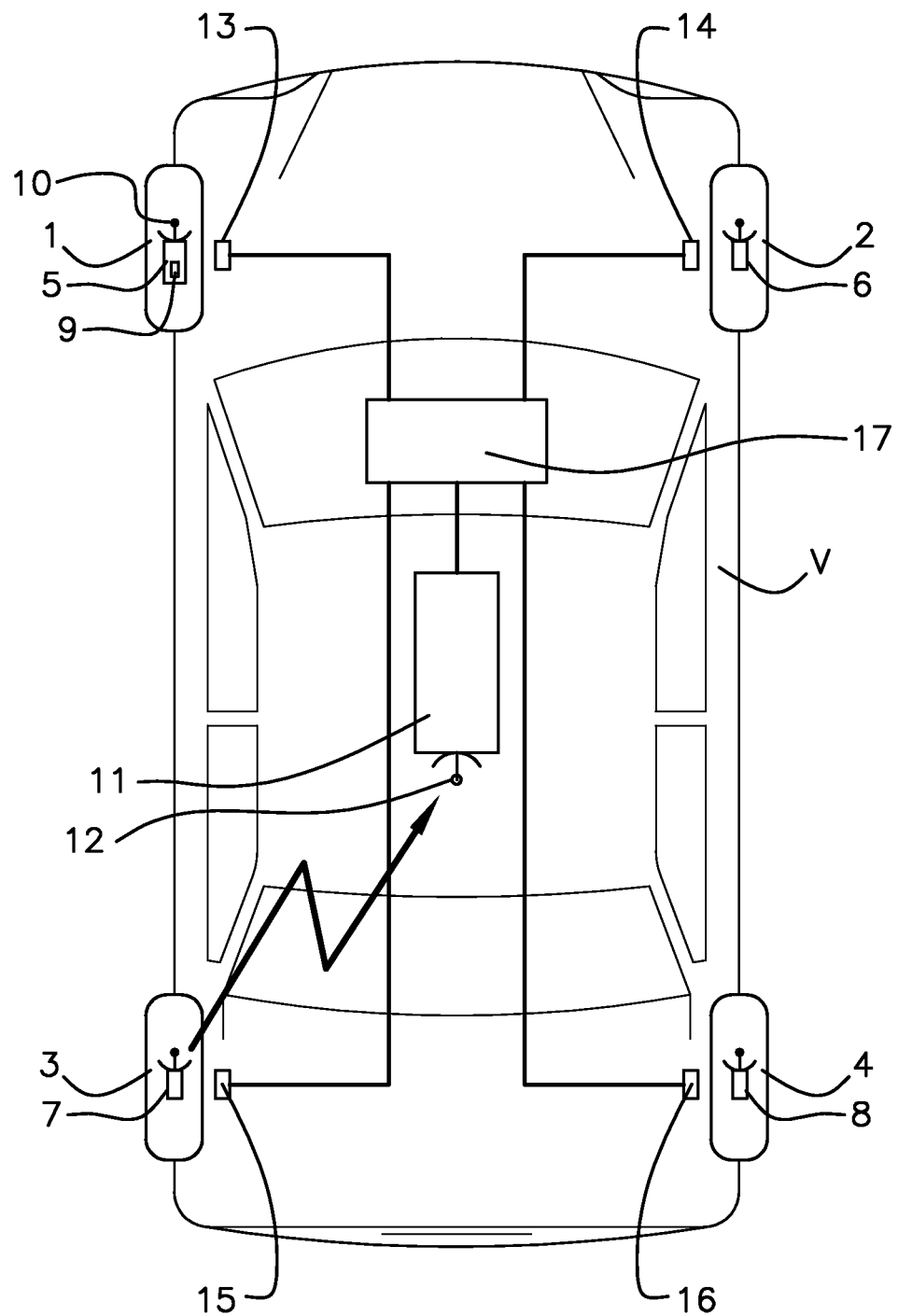

| | | | |
|---|---|---|---|
| 6,112,587 A | 9/2000 | Oldenettel | |
| 6,435,020 B1 | 8/2002 | Oldenettel et al. | |
| 7,224,263 B2* | 5/2007 | Maehara | B60R 21/0132 |
| | | | 307/10.2 |
| 2003/0197603 A1* | 10/2003 | Stewart | B60C 23/0416 |
| | | | 340/442 |
| 2044/0066290 | 4/2004 | Hernando et al. | |
| 2005/0150284 A1 | 7/2005 | Hernando et al. | |
| 2009/0186535 A1* | 7/2009 | Sullivan | B60F 3/0007 |
| | | | 440/6 |
| 2009/0294206 A1* | 12/2009 | Oblizajek | B62D 5/0472 |
| | | | 180/446 |
| 2009/0317266 A1* | 12/2009 | Rampen | F03C 1/0447 |
| | | | 417/53 |
| 2010/0214791 A1* | 8/2010 | Schofield | B60Q 1/1423 |
| | | | 362/466 |
| 2010/0256887 A1* | 10/2010 | Linda | B60L 3/10 |
| | | | 701/82 |
| 2010/0324766 A1* | 12/2010 | Linda | B60T 8/172 |
| | | | 701/22 |
| 2011/0169627 A1* | 7/2011 | Fink | B60C 23/0416 |
| | | | 340/442 |
| 2011/0295457 A1* | 12/2011 | Linda | B60T 8/172 |
| | | | 701/498 |
| 2012/0053853 A1* | 3/2012 | Tan | B60W 40/105 |
| | | | 702/35 |
| 2015/0224845 A1* | 8/2015 | Anderson | B60G 17/019 |
| | | | 701/37 |

FOREIGN PATENT DOCUMENTS

| | | |
|---|---|---|
| EP | 0 895 879 A2 | 2/1999 |
| EP | 0997326 | 5/2000 |
| EP | 1 403 099 A1 | 3/2004 |
| EP | 1 616 723 A1 | 1/2006 |
| JP | 2004-331011 | 11/2004 |
| JP | 2010-122023 | 6/2010 |
| WO | 03/051652 A1 | 6/2003 |

* cited by examiner

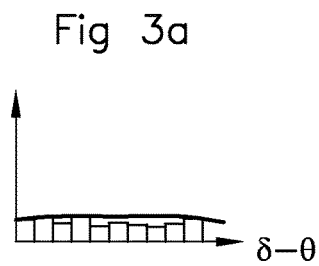
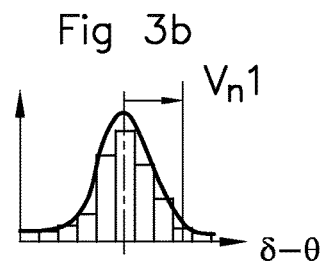
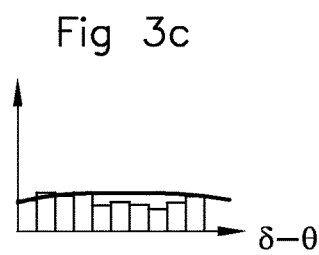
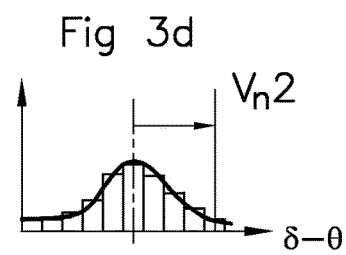
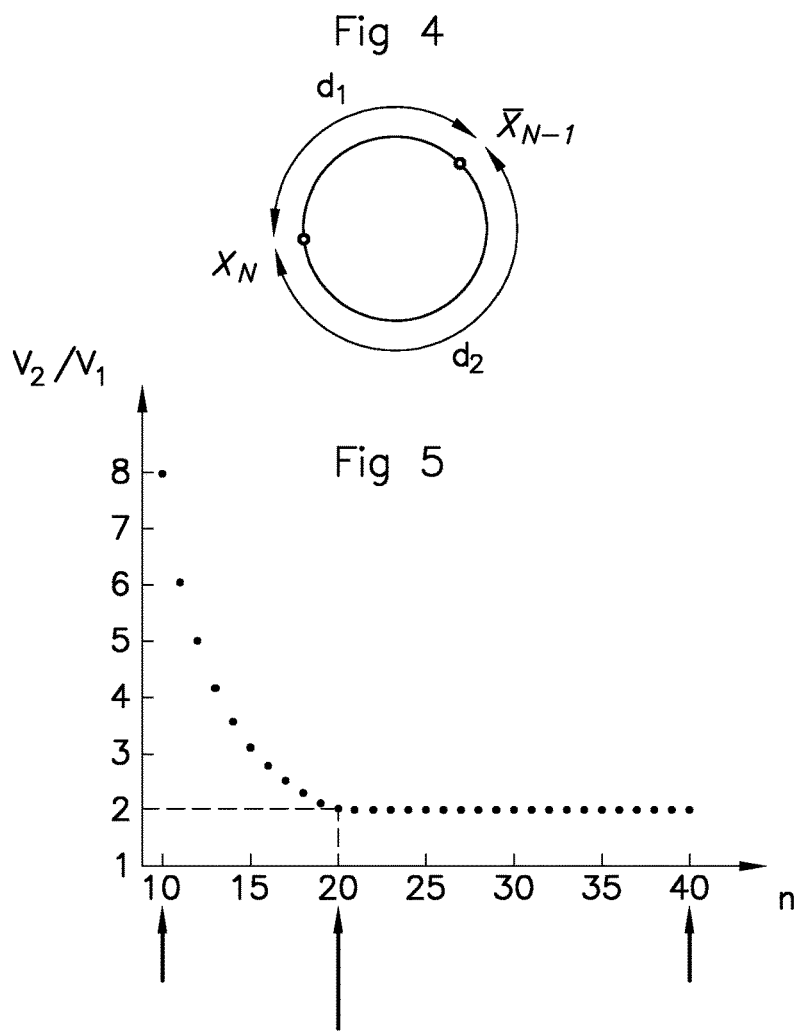

METHOD FOR LOCATING THE POSITION OF THE WHEELS OF A VEHICLE

The invention relates to a method for locating the position of the wheels of a motor vehicle each equipped with an electronic module designed to transmit, to a central processing unit fitted on the vehicle, signals comprising data representing operational parameters of each wheel and an identification code of said electronic module.

Motor vehicles increasingly have, for safety purposes, monitoring systems comprising sensors mounted on each of the wheels of the vehicle, dedicated to the measurement of parameters, such as the pressure or temperature of the tires fitted to these wheels, and intended to inform the driver of any abnormal variation of the measured parameter.

These monitoring systems are conventionally provided with an electronic module mounted on each of the wheels of the vehicle, including, in addition to the aforesaid sensors, a microprocessor and a radio transmitter and with a unit for receiving the signals transmitted by the transmitters, comprising a computer integrating a radio receiver connected to an antenna.

One of the problems of these systems which has to be solved is due to the obligation of having to associate each signal received by the receiver of the central processing unit with an item of information relating to the location of the electronic module and therefore of the wheel which is the source of this signal, this obligation persisting during the service life of the vehicle, that is to say it has to be met even after wheel changes or more simply after reversing the position of these wheels.

Many methods are currently proposed for the purpose of this location of the position of the wheels of a vehicle, among which are location methods, notably such as described in the patents EP 0 806 306 and EP 0 895 879, whose concept is based on the correlation existing between the signals delivered by a speed sensor fitted to a wheel and the signals delivered by a speed sensor fitted to the motor vehicle close to that wheel.

As most present day vehicles are equipped with active safety systems such as the "ABS" anti-lock braking system, the "ESP" dynamic stability control system, such location methods are notably of major interest in terms of installation cost, because the location of the wheels is carried out by correlation of the signals delivered by the speed sensors of said active safety system and signals delivered by the speed sensors usually integrated in the electronic modules of the monitoring system.

Because of this, the use of these methods of location in fact simply necessitates the implementation of software for processing the signals delivered but does not require any addition of specific hardware.

The present invention also relates to a location method based on this principle of correlation and its first purpose is to provide such a location method particularly adapted to the performance of present day electronic modules that are of high performance in terms of reactivity and reliability.

Another purpose of the invention is to provide a location method making it possible to eliminate certain risks of malfunction notably resulting from possible changes in the quality of the signals delivered by the speed sensors of the active safety systems.

For this purpose, the invention relates to a method for locating the position of the wheels of a vehicle comprising:

r wheels each equipped with an electronic module integrating means for measuring the angular position of said electronic module and a transmitter intended for transmitting signals comprising data representing operational parameters of each wheel and an identification code of said electronic module, positioned on the vehicle close to each of the wheels, a wheel speed sensor capable of providing, in the form of values convertible into angular values, data representing the orientation of the wheel, and, mounted on the vehicle, a central processing unit, on the one hand provided with a receiver for receiving signals coming from the electronic modules and, on the other hand, connected to the different wheel speed sensors.

According to the invention, this locating method consists, for the purpose of locating the position of a wheel:

for the electronic module equipping the wheel, in delivering, at a time t1, a signal called the first signal RF1, transmitted for a given angular position of said electronic module, and then at successive times $t_2, t_3 \ldots t_n$, (n−1), signals RF2 . . . RFn transmitted for angular positions of said electronic module shifted by determined angular values, $\theta_2$ to $\theta_n$ respectively, with respect to the angular position of transmission of the first signal, where $0° \le \theta i \le 360°$ (i=2 to n), each of the n signals RF1 . . . RFn comprising the identification code of the electronic module and data representing the angular position of transmission, for the central processing unit:
in gathering the values convertible into angular values $\delta_1$ to $\delta_n$ measured by each of the r wheel speed sensors, at each of the successive times $t_1$ to $t_n$, in calculating, for each series of angular values $\delta_1$ to $\delta_n$ corresponding to the values measured by each wheel measuring sensor, a characteristic value $V_n1$, $V_n2 \ldots V_nr$ representing the dispersion of the series of values $\delta_1, (\delta_2-\theta_2) \ldots (\delta_n-\theta_n)$, in selecting, by comparison of the r characteristic values $V_n1, V_n2 \ldots V_nr$, the most closely grouped series of angular values $\delta_1, (\delta_2-\theta_2) \ldots (\delta_n-\theta_n)$, and in allocating the identification code of the electronic module to the position of the wheel located close to the wheel speed sensor which is the source of the most closely grouped series of angular values $\delta_1, (\delta_2-\theta_2) \ldots (\delta_n-\theta_n)$.

For the purpose of locating the position of a wheel, the method according to the invention therefore consists:

in determining, at each time $t_1, t_2 \ldots t_n$ of transmission of a signal and for each speed sensor, a characteristic value, such as the variance, standard deviation, of the dispersion of the angular values $\delta_1, (\delta_2-\theta_2) \ldots (\delta_n-\theta_n)$ calculated from the differences between the angular values measured par le speed sensor and the angular positions of the electronic module at the time of transmission of the signal, and in allocating the identification code of the electronic module to the position of the wheel located close to the wheel speed sensor which is the source of the most closely grouped series of angular values, that is to say the series whose dispersion is the least.

In practice, such a method proves to be very efficient in terms of reactivity and reliability. Moreover, this method does not impose a fixed and unique position for the transmission of the signals by the electronic modules but, on the contrary, authorizes any number of transmission positions offset with respect to each other by given angular values. Because of this, this method meets the current requirements which require a sufficient variety of predetermined transmission angles in order to guarantee the correct functioning of the locating function whatever the nature of the vehicles provided with the monitoring system may be.

According to an advantageous implementation of invention, the speed of movement of the vehicle is measured and a threshold speed is determined beyond which an inhibit procedure is used:

consisting, when the speed of movement of the vehicle becomes less than the threshold speed, in storing the characteristic values $V_n1$, $V_n2$ ... $V_nr$ of the r dispersions of values $\delta_1$, $(\delta_2-\theta_2)$ ... $(\delta_n-\theta_n)$, and in suspending the locating procedure, at the end of which, when the speed of movement again becomes greater than the threshold value, the locating procedure is restarted after receiving a first signal RFd coming from the electronic module equipping the wheel in the process of being located, on the basis of dispersions, on the one hand characterized by the stored characteristic values $V_n1$, $V_n2$ ... $V_nr$ and on the other hand centered on values corresponding to the values $\delta_d-\theta_d$ calculated from the values measured by each of the r wheel speed sensors at the time td of transmission of the first signal RFd by the electronic module equipping the wheel.

This implementation makes it possible to overcome a current major disadvantage of location techniques using the wheel speed sensors of active safety systems, namely the malfunctions notably resulting from changes in the quality of the signals delivered by said speed sensors, which can happen notably when the speed of movement of the vehicle is low, for example less than 2 km/h, or during a forward/reverse change of direction of movement.

At the present time, the problems related to low speeds of movement have not been solved. The taking into account of these events is only covered by an increase in the severity of the convergence criterion which results either in an increase in the convergence time of the locating procedure or, in the worst case, in a failure of that procedure.

With regard to the problem of the change of direction of movement, at present this imposes retrieving this information either on the multiplexed network installed in the vehicle (where this information is however rarely available), or by a direct link with the gearbox which however results in a considerable excess cost and in difficulties of installing said link in the vehicle.

In order to solve these problems, the invention itself consists in monitoring the speed of movement of the vehicle in order, firstly, to interrupt (inhibit) the location procedure when the speed of movement of the vehicle becomes less than a given threshold speed.

Subsequently, when a normal speed is detected, the data representing the characteristic values of the dispersions, collected during the interruption of the procedure, are retrieved and recentered on the angular values calculated at the time td of transmission of the first signal RFd by the electronic module equipping the wheel in the process of being located.

According to this method, the collected data are not corrupted so that the location procedure can continue with the history accumulated before the inhibit procedure.

From the same perspective, when the wheel speed sensors consist of sensors of an active safety system, the method according to the invention advantageously consists in also using the inhibit procedure when said active safety system is triggered.

Moreover, the comparison of the r characteristic values $V_n1$, $V_n2$ ... $V_nr$ and the allocation of the identification code of the electronic module advantageously consist, according to the invention, starting from the reception of at least a predetermined number n of signals:

in selecting the two characteristic values $V_n1$, $V_n2$ of lowest value, where $V_n2 > V_n1$, in comparing the ratio $V_n2/V_n1$ with a predetermined threshold, and:

in allocating the identification code to the wheel located close to the wheel speed sensor which is the source of the series of angular values exhibiting the characteristic $V_n1$, when the ratio $V_n2/V_n1$ is greater than the threshold, in continuing the procedure for locating the position of the wheel when the ratio $V_n2/V_n1$ is less than the threshold.

Moreover, the threshold advantageously has a value that decreases as a function of the number n of signals transmitted by the electronic module, such as, advantageously, a value inversely proportional to the number of signals transmitted by the electronic module.

By way of advantageous example of implementation, the threshold thus varies between a maximum value equal to 8 for a number of signals transmitted by the electronic module equal to ten, and a minimum value equal to 2 for a number of signals transmitted by the electronic module equal to or greater than twenty.

According to another advantageous implementation of the invention, when a signal of order n is received from an electronic module, the angular value $(\delta_n-\theta_n)$ taken into account for the purpose of determining the new characteristic value of each dispersion is selected such that the angular distance d between the value $(\delta_n-\theta_n)$ and the mean $\overline{X}(n-1)$ of the (n-1) values $\delta_1$, $(\delta_2-\theta_2)$ ... $(\delta_{n-1}-\theta_{n-1})$ is equal to min(d1, d2), where d1 and d2 represent the two complementary angular sectors delimited by the values $(\delta_n-\theta_n)$ and $\overline{X}(n-1)$ established on a circular circumference.

During the integration of a new item of data, such a method in fact makes it possible to guarantee the accuracy of the "impact" of this new item of data on the distribution of preceding items of data, and thus to avoid aberrations resulting from taking an erroneous value of said impact into account.

Moreover, the characteristic value $V_n$ of the dispersion of n angular values is then advantageously such that:

$$V_n = V_{n-1} \cdot (n-1)/n + d^2 \cdot (n-1)/n^2$$

where d=min(d1, d2).

The use off such a recurrence formula in fact makes it possible to reduce the necessary memory size.

Figure 2:
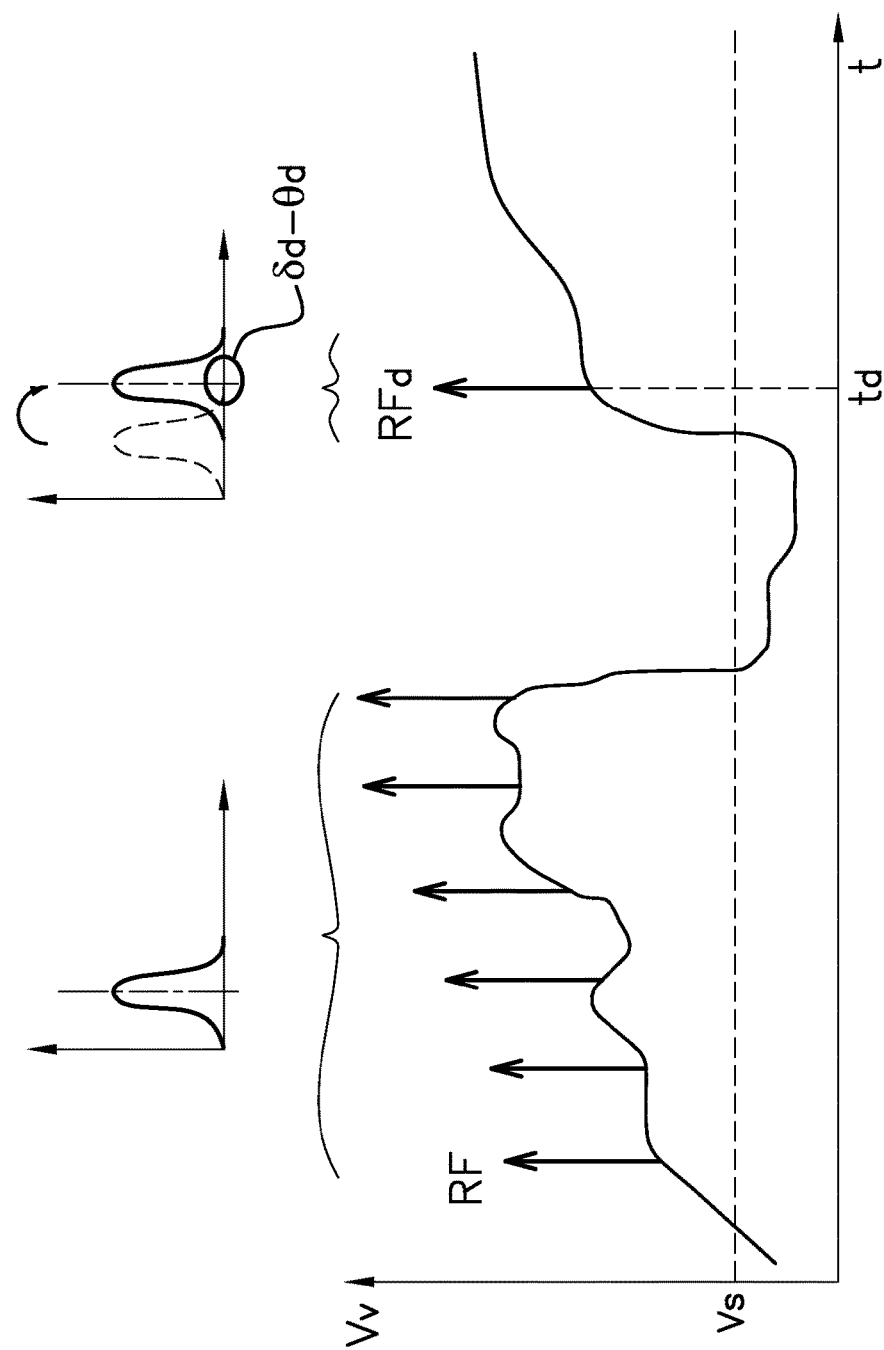

Other features, purposes and advantages of the invention will emerge from the following detailed description given with reference to the appended drawings which show a preferred implementation of it by way of non-limiting example. In these drawings:

FIG. 1 is a diagrammatic plan view of a vehicle provided with a monitoring system and with an active safety system allowing the implementation of the method according to the invention for locating the position of the wheels of said vehicle, FIG. 2 consists of explanatory graphs of the principle of the inhibit procedures used by the locating method according to the invention, FIGS. 3a to 3d consist of four diagrams, each one representing, during the location of a wheel, the dispersion of the values obtained from the measurements carried out by one of the wheel speed sensors, FIG. 4 is an explanatory diagram of the principle of determination of the angular distance d during the reception of a new signal of order n coming from an electronic module, and FIG. 5 is a curve representing the variation of the value of the threshold determining the stopping of the locating procedure, as a function of the number of signals coming from an electronic module.

The method according to the invention is designed to be used for the purpose of locating the position of the wheels of a vehicle V such as shown in FIG. 1, provided with four wheels 1-4 and equipped with a system for monitoring parameters, such as the pressure or temperature of the tires, and with an active safety system such as an "ABS" Anti-lock Braking System or an, "ESP" dynamic stability control system.

In the usual way, the monitoring system conventionally comprises, firstly, associated with each wheel 1-4, an electronic module 5-8, for example firmly attached to the rim of said wheel such that it can be positioned inside the casing of the tire.

Each of the electronic modules 5-8 includes sensors dedicated for measuring parameters of the tires, connected to a microprocessor central processing unit connected to a transmitter 10.

Each of these electronic modules 5-8 also includes, in a conventional manner, means 9 for measuring the angular position of said electronic module. Such measuring means can advantageously consist of an accelerometer capable of providing modulated signals representing values of the gravity and therefore of the angular position of the electronic module, whose frequency, equal to the frequency of rotation of the wheels, furthermore makes it possible to calculate the speed of rotation of said wheels.

The monitoring system also comprises a central processing unit 11 situated in the vehicle V, comprising a microprocessor and integrating a receiver 12 capable of receiving the signal transmitted by the transmitters 10 of each of the electronic modules 5-8.

The vehicle V is also equipped with an active safety system such as an "ABS" Anti-lock Braking System, or an "ESP" dynamic stability control system, comprising four wheel speed sensors 13-16 positioned on the vehicle V, each one close to a wheel 1-4, and designed to provide, in the form of values convertible into angular values, data representing the orientation of said wheel. The location of the vehicle of each of these speed sensors is known.

Moreover, this active safety system comprises an "ABS" or "ESP" computer 17 connected to the different wheel speed sensors 13-16, so as to receive the items of wheel speed information measured by said sensors, and programmed to anticipate adjustments intended to prevent the locking of the wheels 1-4.

In the usual way, the wheel speed sensors 13-16 consist of inductive, magnetoresistive or Hall Effect sensors, designed to measure the speed of rotation of each wheel 1-4 on a toothed or magnetic wheel.

For the purpose of locating each wheel 1-4 of the vehicle V, the method according to the invention consists in using the data provided by the accelerometers 9 and the sensors 13-16, according to the method described below.

Firstly, the electronic module 5-8 equipping the wheel 1-4 to be located provides a plurality of signals including a first signal RF1 transmitted at a time $t_1$ for a given angular position of said electronic module, and then (n−1) signals RF2 ... RFn transmitted at successive times $t_2, t_3 ... t_n$ for angular positions of said electronic module shifted by determined angular values, $\theta_2$ to $\theta_n$ respectively, with respect to the angular position of transmission of the first signal, where $0° \le \theta_i \le 360°$ (i=2 to n). Each of these n signals RF1 ... RFn notably comprises, in the usual way, the identification code of the electronic module 5-8 and data representing the angular position of transmission.

The transmission of these signals is carried out over several seconds, generally 15 to 20 seconds, on the one hand for compliance with radio-frequency standards and, on the other hand, to allow a sufficient "desynchronizing" of the wheels 1-4, At the same time, the sensors 13-16 deliver to the computer 17 data representing the orientation of the associated wheels 1-4, in the form of values convertible into angular values (number of the tooth of the toothed wheel, etc.).

As this is an active safety system, the time of transmission of these signals is distinctly shorter than that of the electronic modules 5-8, for example of the order of 10 ms to 20 ms.

As shown in FIGS. 3a-3d, the central processing unit 11 of the monitoring system is itself programmed to:
  gather the values transmitted by the computer 17 and convert the values measured at the successive times $t_1$ to $t_n$ into angular values $\delta_1$ to $\delta_n$,
  calculate, for each series of angular values $\delta_1$ to $\delta_n$ corresponding to the values measured by each wheel sensor 13-16, a characteristic value, in this example the variance $V_n 1, V_n 2, V_n 3, V_n 4$, representing the dispersion of the series of values $\delta_1, (\delta_2 - \theta_2) ... (\delta_n - \theta_n)$,
  select the two characteristic values $V_n 1, V_n 2$ of lowest value,
  compare the ratio $V_n 2/V_n 1$ with a predetermined decision threshold, and:
    allocate the identification code to the wheel 1-4 located close to the wheel speed sensor 13-16 which is the source of the series of angular values exhibiting the variance $V_n 1$, when the ratio $V_n 2/V_n 1$ is greater than the decision threshold,
    continue the location procedure when the ratio $V_n 2/V_n 1$ is less than the decision threshold.

Moreover, the decision threshold has a value that is inversely proportional to the number of signals transmitted by the electronic module 5-8. As shown in FIG. 5, this decision threshold varies, more precisely, between a maximum value equal to 8 for a number of signals transmitted by the electronic module 5-8 equal to ten and a minimum value equal to 2 for a number of transmitted signals equal to or greater than twenty.

Moreover, the location method is advantageously terminated when the number of signals transmitted reaches a ceiling value, equal to forty in this example, representing an obvious problem preventing the success of the location procedure.

Moreover, during this procedure and during the reception of a signal of order n coming from the electronic module 5-8, the angular value $(\delta_n - \theta_n)$ taken into account for determining the new variance of each dispersion, is selected, as shown in FIG. 4, such that the angular distance d between the value $(\delta_n - \theta_n)$ and the mean $\overline{X}(n-1)$ of the (n−1) values $\delta_1$, $(\delta_2 - \theta_2) ... (\delta_{n-1} - \theta_{n-1})$ is equal to min(d1, d2), where d1 and d2 represent the two complementary angular sectors delimited by the values $(\delta_n - \theta_n)$ and $\overline{X}(n-1)$ established on a circular circumference.

On the basis of this principle, the new characteristic variance $V_n$, of the dispersion of the n angular values, is calculated from the following formula:

$$V_n = V_{n-1} \cdot (n-1)/n + d^2 \cdot (n-1)/n^2$$

where d=min(d1, d2).

Moreover, during the location procedure, the method according to the invention also consists in measuring the speed $V_v$ of movement of the vehicle and in monitoring the activity of the active safety system, in such a way as to implement an inhibit procedure when the speed $V_v$ of movement of the vehicle V becomes less than a threshold speed $V_s$, where for example $V_s$=2 km/h, and/or when the active safety system is deactivated.

As shown in Tel in FIG. 2, this inhibit procedure consists in storing the characteristic values $V_n1$, $V_n2$, $V_n3$, $V_n4$ of the four dispersions of values $\delta_1$, $(\delta_2-\theta_2)$ ... $(\delta_n\theta_n)$, and in suspending the location procedure as long as the speed $V_v$ of movement of the vehicle V remains below the threshold speed $V_s$ and/or for as long as the active safety system is deactivated.

At the end of this inhibit procedure, for example as shown in FIG. 2, when the speed of movement $V_v$ again becomes higher than the threshold value $V_s$, the central processing unit 11 is programmed to command the restarting of the locating procedure on reception of a first signal RFd coming from the electronic module 5-8 equipping the wheel 1-4 in the process of being located, on the basis of dispersions, on the one hand characterized by the stored characteristic values $V_n1$, $V_n2$, $V_n3$, $V_n4$ and on the other hand centered on values corresponding to the values $\delta_d-\theta_d$ calculated from the values measured by each of the wheel speed sensors 13-16 at the time td of transmission of the first signal RFd.

When restarting, the variances taken into account therefore consist of the variances $V_n1$, $V_n2$, $V_n3$, $V_n4$ stored at the time of interrupting the procedure, recentered on the angular values $\delta_d-\theta_d$ calculated at the time td of transmission of the first signal RFd by the electronic module equipping the wheel in the process of being located.

Thus, on the basis of this principle, the variances calculated subsequently depend solely on the variances $V_n1$, $V_n2$, $V_n3$, $V_n4$ and on the angular values $\delta_{d+1}-\theta_{d+1}$, $\delta_{d+2}-\theta_{d+2}$ ..., that is to say values not affected by events occurring during the inhibit procedure.

The location method according to the invention described above has the advantage of constituting a high-performance method in terms of reactivity and of reliability, furthermore not susceptible to being affected by possible changes in the quality of the signals delivered by the speed sensors of the active safety systems used for the purpose of implementing said method.

The invention claimed is:

1. A method for locating the position of the wheels (1-4) of a vehicle (V), the vehicle comprising:
   r wheels (1-4), each equipped with an electronic module (5-8), integrating means (9) for measuring the angular position of said electronic module, and a transmitter (10) for transmitting signals comprising data representing operational parameters of each of said wheels and an identification code of said electronic module,
   positioned on the vehicle (V) close to each of the wheels (1-4), a wheel speed sensor (13-16) providing, in the form of values convertible into angular values, data representing orientation of the respective one of the wheels (1-4), and
   mounted on the vehicle (V), a central processing unit (11), provided with a receiver (12) for receiving signals coming from the electronic modules (5-8) and connected to the different wheel speed sensors (13-16),
   said method for locating the position of a wheel (1-4) comprising:
   the electronic module (5-8) equipping the wheel delivering, at a time t1, a signal called the first signal RF1, transmitted for a given angular position of said electronic module, and then at successive times $t_2$, $t_3$ ... $t_n$, (n−1) signals RF2 ... RFn transmitted for angular positions of said electronic module shifted by determined angular values, $\theta_2$ to $\theta_n$ respectively, with respect to the angular position of transmission of the first signal, where $0° \leq \theta i \leq 360°$ (i=2 to n), each of the n signals RF1 ... RFn comprising the identification code of the electronic module (5-8) and data representing the angular position of transmission, and
   the central processing unit (11):
   gathering the values convertible into angular values $\delta_1$ to $\delta_n$ measured by each of the r wheel speed sensors (13-16), at each of the successive times $t_1$ to $t_n$,
   calculating, for each series of angular values $\delta_1$ to $\delta_n$ corresponding to the values measured by each wheel measuring sensor (13-16), a characteristic value $V_n1$, $V_n2$ ... $V_nr$ representing the dispersion of the series of values $\delta_1$, $(\delta_2-\theta_2)$ ... $(\delta_n-\theta_n)$,
   selecting, by comparison of the r characteristic values $V_n1$, $V_n2$ ... $V_nr$, the most closely grouped series of angular values $\delta_1$, $(\delta_2-\theta_2)$ ... $(\delta_n-\theta_n)$, and
   allocating the identification code of the electronic module (5-8) to the position of the wheel (1-4) located close to the wheel speed sensor (13-16) which is the source of the most closely grouped series of angular values $\delta_1$, $(\delta_2-\theta_2)$ ... $(\delta_n-\theta_n)$.

2. The locating method as claimed in claim 1, further comprising measuring the speed of movement $V_v$ of the vehicle (V) and determining a threshold speed $V_s$ beyond which an inhibit procedure is used,
   the inhibit procedure comprising, when the speed of movement $V_v$ of the vehicle (V) becomes less than the threshold speed $V_s$, storing the characteristic values $V_n1$, $V_n2$ ... $V_nr$ of the r dispersions of values $\delta_1$, $(\delta_2-\theta_2)$ ... $(\delta_n-\theta_n)$, and suspending the locating procedure,
   at the end of which, when the speed of movement $V_v$ again becomes greater than the threshold value $V_s$, restarting the locating procedure after receiving a first signal (RFd) coming from the electronic module (5-8) equipping the wheel (1-4) in the process of being located, on the basis of dispersions, on the one hand characterized by the stored characteristic values $V_n1$, $V_n2$ ... $V_nr$ and on the other hand centered on values corresponding to the values $\delta_d-\theta_d$ calculated from the values measured by each of the r wheel speed sensors (13-16) at the time td of transmission of the first signal (RFd) by the electronic module equipping the wheel.

3. The locating method as claimed in claim 2, wherein when the wheel speed sensors (13-16) comprise sensors of an active safety system, a further inhibit procedure is used when said active safety system is deactivated,
   the further inhibit procedure comprising, when the active safety system is deactivated, storing the characteristic values $V_n1$, $V_n2$ ... $V_nr$ of the r dispersions of values $\delta_1$, $(\delta_2-\theta_2)$ ... $(\delta_n-\theta_n)$, and suspending the locating procedure,
   at the end of which, when the active safety system is activated, restarting the locating procedure after receiving a first signal (RFd) coming from the electronic module (5-8) equipping the wheel (1-4) in the process of being located, on the basis of dispersions, on the one hand characterized by the stored characteristic values $V_n1, V_n2 \ldots V_nr$ and on the other hand centered on values corresponding to the values $\delta_d-\theta_d$ calculated from the values measured by each of the r wheel speed sensors (13-16) at the time td of transmission of the first signal (RFd) by the electronic module equipping the wheel.

4. The locating method as claimed in claim 1, wherein the comparison of the r characteristic values $V_n1, V_n2 \ldots V_nr$ and the allocation of the identification code of the electronic module (5-8) comprise, starting from the reception of at least a predetermined number n of signals:
   selecting the two characteristic values $V_n1, V_n2$ of lowest value, where $V_n2 > V_n1$,
   comparing the ratio $V_n2/V_n1$ with a predetermined threshold, and
   allocating the identification code to the wheel (1-4) located close to the wheel speed sensor (13-16) which is the source of the series of angular values exhibiting the characteristic $V_n1$, when the ratio $V_n2/V_n1$ is greater than the threshold, and continuing the procedure for locating the position of the wheel (1-4) when the ratio $V_n2/V_n1$ is less than the threshold.

5. The locating method as claimed in claim 4, further comprising determining a threshold whose value decreases as a function of the number n of signals transmitted by the electronic module (5-8).

6. The locating method as claimed in claim 5, further comprising determining a threshold whose value is inversely proportional to the number of signals transmitted by the electronic module (5-8).

7. The locating method as claimed in claim 6, further comprising determining a threshold varying between a maximum value equal to 8 for a number of signals transmitted by the electronic module (5-8) equal to ten, and a minimum value equal to 2 for a number of signals transmitted by the electronic module (5-8) equal to or greater than twenty.

8. The locating method as claimed in claim 1, wherein, when a signal of order n is received from an electronic module (5-8), the angular value $(\delta_n-\theta_n)$ taken into account for the purpose of determining the new characteristic value of each dispersion is selected such that the angular distance d between the value $Xn=(\delta_n-\theta_n)$ and the mean $\overline{X}(n-1)$ of the (n−1) values $\delta_1, (\delta_2-\theta_2) \ldots (\delta_{n-1}-\theta_{n-1})$ is equal to min(d1, d2), where d1 and d2 represent the two complementary angular sectors delimited by the values $Xn=(\delta_n-\theta_n)$ and $\overline{X}(n-1)$ established on a circular circumference.

9. The locating method as claimed in claim 8, wherein the characteristic value $V_n$ of the dispersion of n angular values is such that:
   $V_n = V_{n-1} \cdot (n-1)/n + d^2 \cdot (n-1)/n^2$ where d=min (d1, d2).

10. The locating method as claimed in claim 2, wherein the comparison of the r characteristic values $V_n1, V_n2 \ldots V_nr$ and the allocation of the identification code of the electronic module (5-8) comprise, starting from the reception of at least a predetermined number n of signals:
   selecting the two characteristic values $V_n1, V_n2$ of lowest value, where $V_n2 > V_n1$,
   comparing the ratio $V_n2/V_n1$ with a predetermined threshold, and
   allocating the identification code to the wheel (1-4) located close to the wheel speed sensor (13-16) which is the source of the series of angular values exhibiting the characteristic $V_n1$, when the ratio $V_n2/V_n1$ is greater than the threshold, and continuing the procedure for locating the position of the wheel (1-4) when the ratio $V_n2/V_n1$ is less than the threshold.

11. The locating method as claimed in claim 3, wherein the comparison of the r characteristic values $V_n1, V_n2 \ldots V_nr$ and the allocation of the identification code of the electronic module (5-8) comprise, starting from the reception of at least a predetermined number n of signals:
   selecting the two characteristic values $V_n1, V_n2$ of lowest value, where $V_n2 > V_n1$,
   comparing the ratio $V_n2/V_n1$ with a predetermined threshold, and
   allocating the identification code to the wheel (1-4) located close to the wheel speed sensor (13-16) which is the source of the series of angular values exhibiting the characteristic $V_n1$, when the ratio $V_n2/V_n1$ is greater than the threshold, and continuing the procedure for locating the position of the wheel (1-4) when the ratio $V_n2/V_n1$ is less than the threshold.

12. The locating method as claimed in claim 2, wherein, when a signal of order n is received from an electronic module (5-8), the angular value $(\delta_n-\theta_n)$ taken into account for the purpose of determining the new characteristic value of each dispersion is selected such that the angular distance d between the value $Xn=(\delta_n-\theta_n)$ and the mean $\overline{X}(n-1)$ of the (n−1) values $\delta_1, (\delta_2-\theta_2) \ldots (\delta_{n-1}-\theta_{n-1})$ is equal to min(d1, d2), where d1 and d2 represent the two complementary angular sectors delimited by the values $Xn=(\delta_n-\theta_n)$ and $\overline{X}(n-1)$ established on a circular circumference.

13. The locating method as claimed in claim 3, wherein, when a signal of order n is received from an electronic module (5-8), the angular value $(\delta_n-\theta_n)$ taken into account for the purpose of determining the new characteristic value of each dispersion is selected such that the angular distance d between the value $Xn=(\delta_n-\theta_n)$ and the mean $\overline{X}(n-1)$ of the (n−1) values $\delta_1, (\delta_2-\theta_2) \ldots (\delta_{n-1}-\theta_{n-1})$ is equal to min(d1, d2), where d1 and d2 represent the two complementary angular sectors delimited by the values $Xn=(\delta_n-\theta_n)$ and $\overline{X}(n-1)$ established on a circular circumference.

14. The locating method of claim 1, wherein each of the wheels has only one said wheel speed sensor, and wherein the step of gathering the values convertible into angular values $\delta_1$ to $\delta_n$ measured by each of the r wheel speed sensors (13-16), uses only values from the one said wheel speed sensor for each of the wheels.

* * * * *